(12) United States Patent
Theytaz et al.

(10) Patent No.: US 7,439,954 B2
(45) Date of Patent: Oct. 21, 2008

(54) MULTI-LIGHT-SOURCE ILLUMINATION SYSTEM FOR OPTICAL POINTING DEVICES

(75) Inventors: Olivier Theytaz, Savigny (CH); Olivier Mathis, Grimisuat (CH); Baptiste Merminod, Geneva (CH); Pascal Eichenberger, Lausanne (CH)

(73) Assignee: Logitech Europe S.A., Romanel-sur-Morges (CH)

( * ) Notice: Subject to any disclaimer, the term of this patent is extended or adjusted under 35 U.S.C. 154(b) by 951 days.

(21) Appl. No.: 10/826,424

(22) Filed: Apr. 15, 2004

(65) Prior Publication Data

US 2005/0231482 A1    Oct. 20, 2005

(51) Int. Cl.
*G06F 3/033* (2006.01)
(52) U.S. Cl. .................. 345/166; 345/156; 345/163
(58) Field of Classification Search .......... 345/156–172
See application file for complete search history.

(56) References Cited

U.S. PATENT DOCUMENTS

| | | | |
|---|---|---|---|
| 5,288,993 A | 2/1994 | Bidiville et al. | |
| 5,578,813 A | 11/1996 | Allen et al. | |
| 5,578,817 A | 11/1996 | Bidiville et al. | |
| 5,644,139 A | 7/1997 | Allen et al. | |
| 5,686,720 A | 11/1997 | Tullis | |
| 5,703,356 A | 12/1997 | Bidiville et al. | |
| 5,825,044 A | 10/1998 | Allen et al. | |
| 5,854,482 A | 12/1998 | Bidiville et al. | |
| 6,084,574 A | 7/2000 | Bidiville | |
| 6,124,587 A | 9/2000 | Bidiville et al. | |
| 6,172,354 B1 | 1/2001 | Adan et al. | |
| 6,218,659 B1 | 4/2001 | Bidiville et al. | |

(Continued)

FOREIGN PATENT DOCUMENTS

DE    10225661    1/2003

(Continued)

OTHER PUBLICATIONS

*Mouse & Keyboard Products, Intellimouse® Explorer*, [online], © 2004, [retrieved Oct. 22, 2004], 1 page, Retrieved from the Internet:<URL:http://www.microsoft.com/hardware/mouseandkeyboard/productdetai.

(Continued)

*Primary Examiner*—David L Lewis
(74) *Attorney, Agent, or Firm*—The Law Office of Deepti Panchawagh-Jain

(57) ABSTRACT

In one embodiment of an optical pointing device, an illumination system includes a plurality of light sources. Each light source is characterized by a unique set of illumination characteristics. Illumination characteristics include impinging angle, light wavelength, light homogeneity, and the like. A sensor receives electromagnetic energy originating at the light source to scan an imaged area. The sensor measures performance indexes associated with the light sources, which depend on the illumination characteristics. The sensor includes an imaging module, which may include passive filters, and control logic, which includes at least a DSP module and a light sensor selection module. Another embodiment includes additional signaling light sources that do not interfere with the illumination system and are for signaling to the user. A method to select the most adequate light source for any given surface is based on measured performance indices.

40 Claims, 12 Drawing Sheets

U.S. PATENT DOCUMENTS

| | | | |
|---|---|---|---|
| 6,380,927 | B1 | 4/2002 | Ostrum et al. |
| 6,462,330 | B1 | 10/2002 | Venkat et al. |
| 7,116,427 | B2 * | 10/2006 | Baney et al. ............... 345/166 |
| 2005/0024624 | A1 * | 2/2005 | Gruhlke et al. ............ 356/3.01 |
| 2005/0231482 | A1 | 10/2005 | Theytaz |

FOREIGN PATENT DOCUMENTS

| | | |
|---|---|---|
| EP | 1081634 A2 | 3/2001 |
| EP | 1182606 A2 | 2/2002 |
| EP | 1255219 A1 | 11/2002 |
| EP | 1255219 B1 | 11/2002 |
| EP | 1283493 A2 | 2/2003 |
| WO | WO 99/39304 | 8/1999 |
| WO | WO 00/38103 | 6/2000 |
| WO | WO 00/57352 | 9/2000 |

OTHER PUBLICATIONS

*Mouse & Keyboard Products, Trackball Optical*, [online], © 2004, [retrieved Oct. 22, 2004], 2 pages, Retrieved from the Internet:<URL:http://www.microsoft.com/hardware/mouseandkeyboard/productdetai.

*Mouse & Keyboard Products, Microsoft Optical Technology*, [online], © 2004, [retrieved Oct. 22, 2004], 2 pages, Retrieved from the Internet:<URL:http://www.microsoft.com/hardware/mouseandkeyboard/technologies.

Bidiville, Marc "Pointing Device Utilizing a Photodetector Array", Unpublished U.S. Appl. No. 08/199,982, filed on Feb. 18, 1994.

Bidiville, Marc "Pointing Device Utilizing a Photodetector Array", Unpublished U.S. Appl. No. 08/477,448, filed Jun. 7, 1995.

Bidiville, Marc "Pointing Device Utilizing a Photodetector Array", Unpublished U.S. Appl. No. 08/997,222, filed Dec. 23, 1997.

Hewett, Jacqueline "Optical mouse saves space", http://optics.org/cws/article/research/9217, (Jun. 26, 2002), 2 pages.

* cited by examiner

MULTI-LIGHT-SOURCE ILLUMINATION SYSTEM FOR OPTICAL POINTING DEVICES

CROSS REFERENCES TO RELATED APPLICATIONS

This application is related to co-pending U.S. patent applications Ser. No. 10/033,427, filed on Dec. 27, 2001, and Ser. No. 10/122,488, filed on Apr. 12, 2002, both of which are incorporated herein by reference in their entirety.

BACKGROUND OF THE INVENTION

1. Field of the Invention

The present invention relates to electromagnetic energy sources for optical detection systems, more specifically, to multi-light-source optical input devices.

2. Description of the Related Art

Displacement detection based on optical technology is used in several applications, including optical input devices for computer systems. Data processing systems, or computer systems generally, are used in conjunction with a variety of input devices, such as for example, keyboards, pointing devices (e.g., mice, touchpads, and trackballs), joysticks, digital pens, and the like. FIG. ("FIG.") 1 shows a sample diagram of a conventional computer system 100 including two input devices, a pointing device 110 and a keyboard 140. One example of optical displacement detection technology used in a pointing device is an optical mouse. Examples pointing devices using optical detection technology and their operation are described in U.S. Pat. No. 5,288,993 to Bidiville, et al. (issued Feb. 22, 1994) entitled "Cursor Pointing Device Utilizing a Photodetector Array with Target Ball Having Randomly Distributed Speckles" and U.S. Pat. No. 5,703,356 to Bidiville, et al. (issued on Dec. 30, 1997) entitled "Pointing Device Utilizing a Photodetector Array," the relevant portions of which are incorporated herein by reference in their entirety.

There are significant advantages to using optical input devices over other types of input devices, such as, mechanical or opto-mechanical input devices. For example, mechanical or opto-mechanical input devices have mechanical components that are more susceptible to breakdown, wear out, or clogging. Optical input devices reduce, and in some instances eliminate, a number of mechanical parts susceptible to these problems. Instead, optical input devices are manufactured with solid-state components that are less susceptible to such breakdown, dirt, or wear out.

Optical displacement detection systems use differences in images captured over short periods of time to detect displacement and derive movement of a device relative to a surface. In general, a first image of a surface is captured at a first time and is compared with a second image captured shortly after the first image. The changes in the images over a small period of time correspond to displacement of the systems with respect to features of the surface. This displacement information is processed to derive movement data, such as, movement associated with a user display. For example, an optical pointing device in the form of a mouse captures images of a desk surface, and in the case of trackball, of a ball, providing displacement data of features on the surface that is processed to derive movement of a cursor in a computer screen.

FIG. 2 illustrates a conventional optical displacement detection system 200. The conventional optical displacement detection system 200, or optical system in general, includes a conventional illumination subsystem 210 and a conventional optical sensor or detection subsystem 220. The conventional illumination subsystem 210 includes a conventional illumination lens 230 and a conventional source of electromagnetic energy or light source 250. Typically, the light source 250 is a type of light emitting diode ("LED"), for example, a conventional red LED, a laser diode, or the like. Generally, the light source 250 is attached to a printed circuit board ("PCB") (not shown) and positioned with respect to the illumination lens 230 to direct light to an illumination spot 201 on a working or tracking surface 205 (e.g., a desk surface, pad, ball, or the like).

A conventional sensor subsystem 220 includes an imaging lens 240 and a sensor 260. The sensor 260 typically includes an image-capturing module 261, for example, one or more photosensor arrays. Some sensors 260 also include controller circuitry 262 associated with the image-capturing module 261, for example, in the form of digital circuits in the same die or device package. Generally, the controller circuitry 262 performs digital signal processing ("DSP") to derive movement data from the captured images. The sensor assembly 220 is also typically mounted on the PCB and positioned so that the imaging lens 240 optimally captures the electromagnetic energy (e.g., light) scattered from surface 205.

The area of surface 205 that scatters electromagnetic energy and is scanned or "imaged" by the sensor at any given time during normal operation is referred to as an imaged area 202. It should be noted that although typically surface 205 is a flat surface, such as a mouse pad, table top, or the like it is not necessarily so. Surface 205 can be any surface, for example, a person's arm or hand, a sphere (as in a track ball pointing device), the arm of a chair or couch, or any other surface that can be placed in close proximity with the optical displacement detection system 200. The sensor analyzes the images scanned or taken of the surface 205 to provide displacement information. Preferably, the imaged area 202 substantially overlaps with the illumination spot 201 so that the light is efficiently used to illuminate only that area of the working surface 205 that is imaged or scanned by the sensor 260. However, due to misalignment and other mechanical tolerances in optical system components, illumination spot 201 is generally larger than the imaged area 202 to guarantee that enough electromagnetic energy is scattered towards the sensor 260.

The performance of an optical displacement detection system 200 depends on several factors. For example, good surface illumination and good image quality are important factors for the efficient performance of an optical input device 110. In addition, the alignment of all the components that contribute to the optical path in an optical detection system 200 is important for the optimal illumination of the imaged area 202, that is, the alignment between lenses, light source, and sensor is important for the optimal overlap of the illumination spot 201 with the imaged area 202 on the working surface 205. Co-pending U.S. patent application Ser. No. 10/122,488, filed Apr. 12, 2002, entitled "Attachment System for Use in an Optical Illumination System," which is commonly assigned to the assignee of the present invention and is incorporated herein by reference in its entirety, is directed to one embodiment of an improvement in component alignment.

Another performance factor is the quality of the image that reaches the image-capturing module 261. This in part depends on optical filtering of the light by the imaging lens and subsequent processing. For example, improvements in optical filtering and subsequent processing are provided by U.S. Pat. No. 6,256,016 (Jul. 3, 2001) to Piot et al., which is commonly assigned to the assignee of the present invention and is incorporated herein by reference in its entirety.

Similarly, the source of electromagnetic energy for the illumination subsystem 210 directly impacts the performance of the optical displacement detection system 200. One improvement in illumination systems 210, for example, is described in co-pending U.S. patent application Ser. No. 10/033,427 filed Dec. 27, 2001, entitled "An Optical Illumination System and Method," which is commonly assigned to the assignee of the present invention and is incorporated herein by reference in its entirety, and which is directed to an efficient illumination system that includes specialized lenses.

However, there is a lack of performance improvements directed to features of the illumination subsystems 210. Particularly, illumination subsystems 210 utilizing either coherent or non-coherent light sources. In general, the performance of optical displacement detection systems is mostly affected by several illumination factors or characteristics of the illumination subsystems, in particular, by light wavelength, light beam impinging angle (shown as "α" in FIG. 2 representative of the median of the light beam, e.g., central ray), homogeneity of the light rays, and intensity. These illumination characteristics affect performance differently depending on the surface 205 of operation. Generally, the higher the intensity of the light source 250, the better the system can perform. However, light intensity directly impacts power consumption of the optical system. In systems in which the power supply is limited, e.g., battery operated systems, it is desirable to minimize the power consumption. Consequently, the intensity of the light source 250 must be commensurate with the performance increase it provides. For example, simply including additional light sources 250 to increase the light intensity may lead to an unjustified increase in power consumption without a significant corresponding increase in performance because other factors, e.g., impinging angle a, homogeneity of light, or wavelength, may have a controlling effect on the performance of the optical system 200 on a particular surface 205.

Further, the pointing device market is becoming crowded with offerings from many different manufacturers. Manufacturers not only need to distinguish their products with performance improvements but also with visually appealing designs. For example, some optical mice suppliers sell devices in different ergonomic shapes, colorful plastic enclosures, and even transparent or translucent enclosures that allow light from the light source 250 of the illumination system 210 to shine through. In particular, this type of feature has lead to optical mice users becoming accustomed to determining operational status of the optical mouse by simply looking at the light emanating from the light source 250. For example, if there is no LED light, a user may think that batteries need to be replaced; or if the light is blinking it may mean that the mouse is lifted too far from a surface; or in the case of a wireless optical mouse, the LED light being off may indicate that a switch needs to be turned on or that the wireless link needs to be reestablished. Thus, the light source 250 itself provides information to the user about the system operational status.

Hence, there is a need for improvements in illumination systems, sensors, and pointing devices to (1) increase pointing device performance, (2) prevent adversely affecting power consumption, (3) provide a way for manufacturers to visually distinguish their devices from competitors, and (4) provide visually status information to users.

SUMMARY OF THE INVENTION

According to the teachings of the present invention, in an optical pointing device for use with a computer system, one embodiment of an optical displacement detection system comprises a sensor assembly and a plurality of light sources. The sensor assembly includes an electromagnetic energy sensing module and a control logic module. The plurality of light sources are configured to have at least one unique illumination characteristic. Illumination characteristics include wavelength, light homogeneity, impinging angle, light intensity and the like. The plurality of light sources are configured to be selected by the control logic for illumination of an imaged area that is scanned by the electromagnetic energy sensing module.

Additionally, the present invention includes an embodiment of an optical pointing device for use in a computer system. The optical pointing device includes a sensor assembly and an illumination assembly. The sensor assembly includes a sensor optically coupled with an imaging lens and electrically coupled with a control logic circuit and power supply. The sensor is configured for receiving electromagnetic energy scattered from an imaged area of a surface. The sensor also includes circuitry to derive pointing device displacement information with respect to the surface of operation by comparing images of the surface captured over a period of time. The illumination assembly includes a plurality of light sources, which are configured to produce an electromagnetic energy beam to illuminate the imaged area. The light sources have unique illumination characteristics, for example, available light wavelengths, impinging angle due to position or lens, and the like.

In addition, in one embodiment, an optical pointing device for use in a computer system includes a sensor assembly, an illumination assembly, and a signaling light source. The sensor assembly has a sensor optically coupled with an imaging lens and electrically coupled with a control logic circuit. The sensor is configured to receive electromagnetic energy from an imaged area of a surface to produce a plurality of images. The control logic circuit is configured to derive pointing device movement data by comparing the plurality of images of the surface taken over a period of time. The optical pointing device also includes an illumination assembly that has a light source for illuminating the imaged area. In addition, the optical pointing device has a signaling light source positioned within the optical pointing device so that it does not interference with the optical path formed between the illumination assembly and the sensor assembly. The signaling light source is configured to be visible to a user.

A sensor for use in an optical displacement detection system includes an image capture module configured to capture electromagnetic energy associated with an imaged area to produce a set of images of the imaged area captured over a period of time. The sensor also includes a digital signal processing ("DSP") module that is electrically coupled to the image capture module to receive image data. The DSP module is configured to derive displacement information from differences between the images of the imaged area. The sensor also includes a light source selection module that is coupled to the DSP module and to a switch selection output line. The light source selection module is configured to produce a light source selection signal in response to a performance index measurement.

One embodiment of a method of selecting one or more light sources for illumination of an imaged area in a multi-light-source optical displacement detection system is provided. The method includes measuring a performance index associated with a light source; selecting an adequate light source based, at least in part, on the measured performance index; and scanning the imaged area with light originating from the selected adequate light source.

The features and advantages described in this specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the inventive subject matter.

BRIEF DESCRIPTION OF THE DRAWINGS

The invention has other advantages and features which will be more readily apparent from the following detailed description of the invention and the appended claims, when taken in conjunction with the accompanying drawings, in which:

DETAILED DESCRIPTION OF THE INVENTION

The Figures ("FIG.") and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention, examples of which are illustrated in the accompanying drawings. It is noted that wherever practicable similar or like reference numbers may be used in the figures and may indicate similar or like functionality.

Figure 3A:
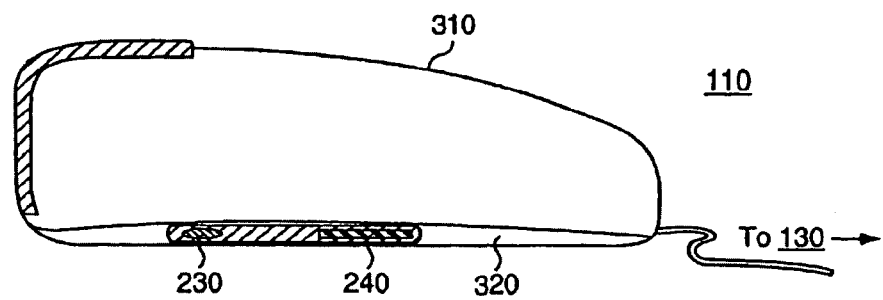
FIGS. 3A and 3B are diagrams illustrating optical displacement systems in a pointing device.

FIG. 3A illustrates a conventional optical mouse 110. The optical mouse is typically housed in an enclosure 310. Generally, the enclosures 310 are made of plastic materials and come in many shapes, e.g., ergonomic shapes, and colors. The optical mouse 110 connects to a computer 130 via a wire, e.g., universal serial bus ("USB"), or a wireless communication unit, e.g., a 27 MHz or Bluetooth compliant radio unit. The enclosure 310 includes sections on the underside surface 320 through which light can go through for the operation of the optical detection system 200. For example, an opening may allow light to go from a light source 250 through an illumination lens 230 and back through an imaging lens 240 to a sensor 260.

Figure 1:
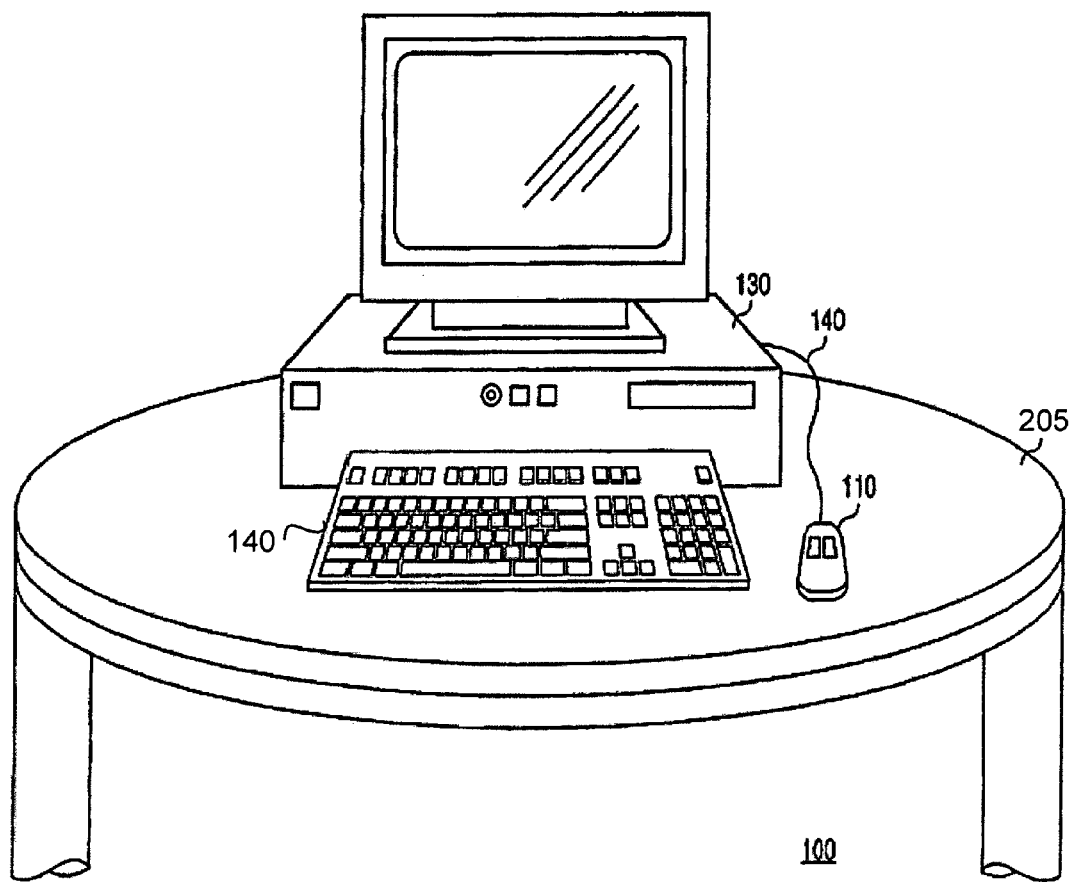
FIG. 1 is a diagram that illustrates a conventional computer system.
Figure 2:
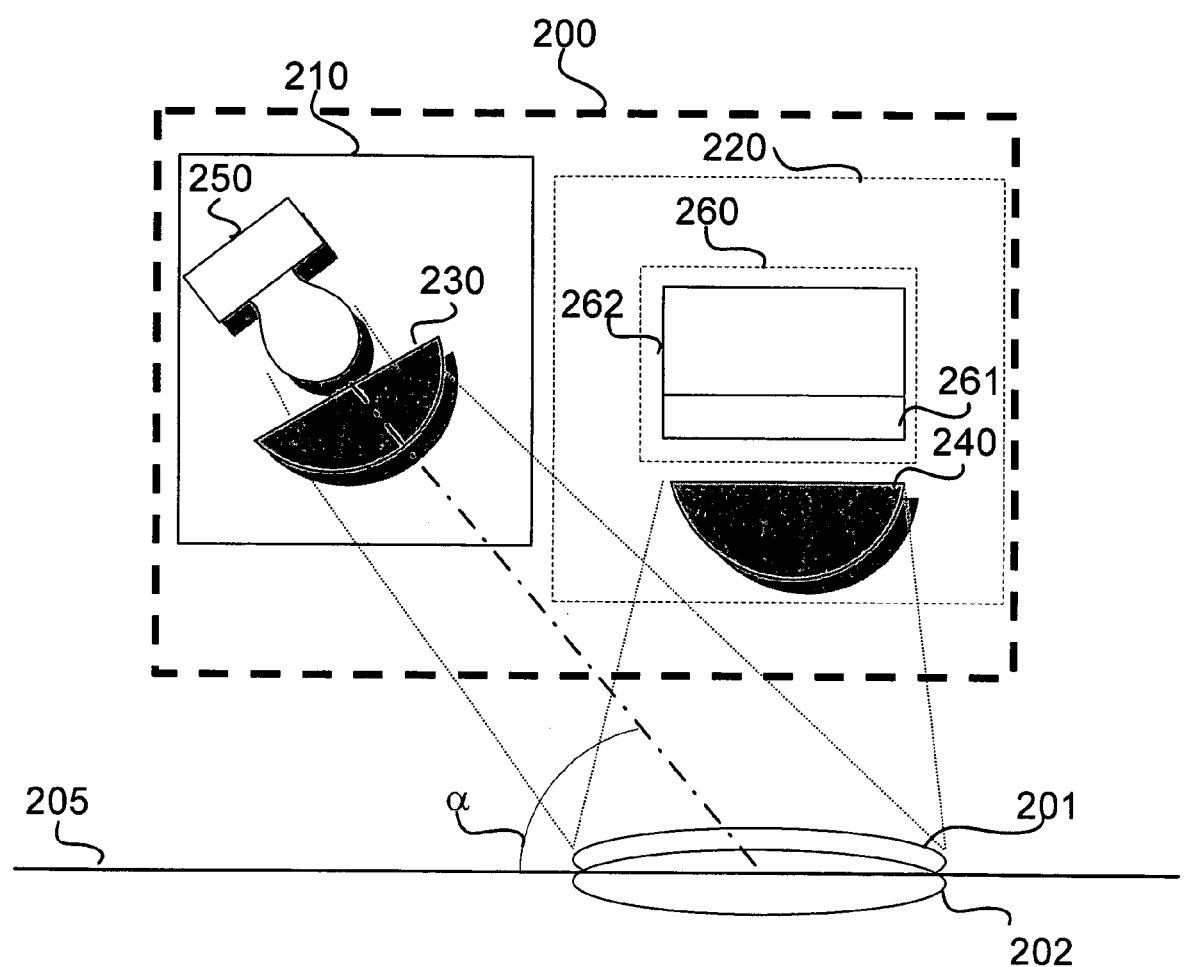
FIG. 2 shows an illustrative system level diagram of the components in a conventional optical displacement detection system.
Figure 3B:
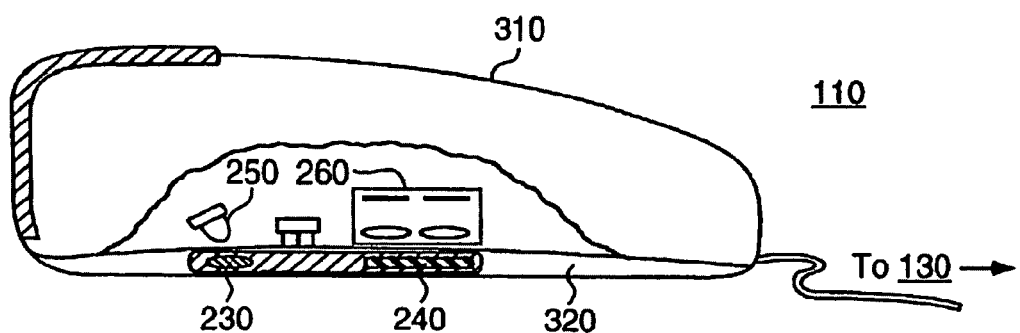

FIG. 3B also shows a conventional optical mouse but, for clarity, a portion of the enclosure 310 has been omitted to show the optical assembly system 200. This type of illustration is further used in connection with other figures. An optical detection system 200 includes, as discussed above with reference to FIG. 2, an illumination subsystem 210 with a light-source 250 and a sensor subsystem 220 with a sensor 260.

Figure 4:
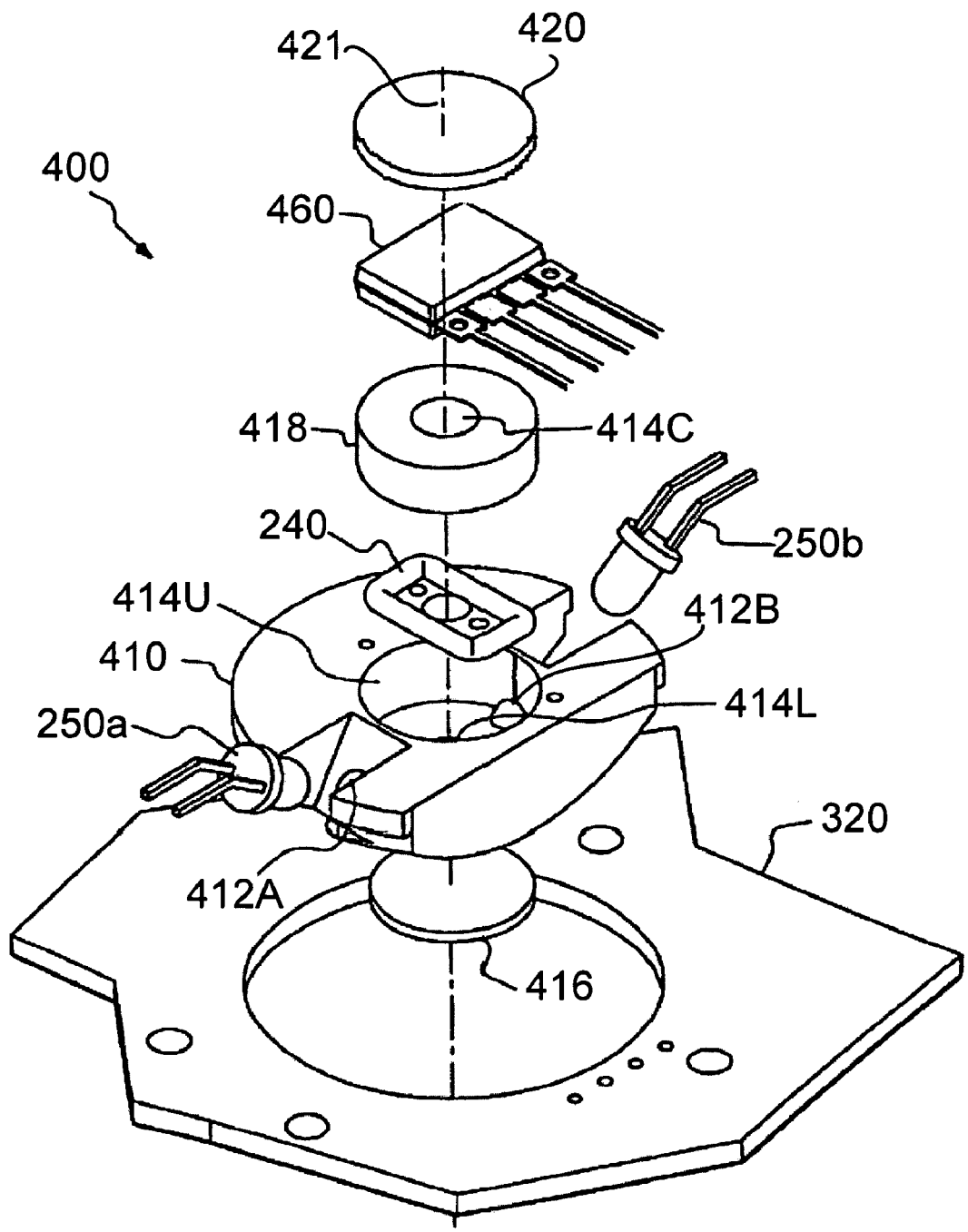
FIG. 4 is a mechanical schematic of one embodiment of a multi-light-source optical displacement detection system.

Now referring to FIG. 4, a mechanical schematic of one embodiment of a multi-light-source optical pointing device is shown. In this embodiment, illumination subsystem 410 comprises two light sources 250a and 250b (250 generally). As discussed below, additional light sources 250 can be used in accordance with the teachings of the present invention. The optical detection subsystem 220 includes an improved sensor 460 capable of light source selection. Some existing pointing devices include multiple optical sensors 260, for example, the device described in co-pending U.S. patent application Ser. No. 09/969,433 (filed Oct. 1, 2001), which is commonly assigned to the assignee of the present invention and is incorporated herein by reference in its entirety. Similar techniques can be applied in conjunction with the teachings of the present invention to provide for a multiple sensor 460 system.

Further, as previously mentioned, some existing optical systems 200 include multiple light sources 250 to increase light intensity and associated optical detection performance as described above. This is accomplished by having the multiple light sources 250 turned on during the device operation. Consequently, power consumption in multiple light source devices is increased proportionally with each additional light source 250. In contrast, as further described below, the sensor 460 includes a module for selecting an illumination configuration based on varying factors controlled by light source type, position, lens configuration, and the like. Light source selection increases optical detection performance avoiding unnecessary increase in power consumption. For example, in one embodiment, one or more of the wavelength, impinging angle, and homogeneity of the illumination is varied by selecting one or more light sources 250 in the illumination subsystem.

Referring back to FIG. 4, the optical assembly 400 includes a molded assembly 410 having a pair of angular bores 412A-B each of which receives, respectively, one of the light sources 250. Angular bore 412A is angled with respect to plate 416 by approximately 25 degrees and angular bore 412B is angled with respect to the plate 416 by approximately 10 degrees. Light sources 250a and 250b are inserted in the cylindrical hole defined by angular bores 412A and 412B respectively. Accordingly, in operation, the light beam from light source 250a illuminates the imaged area 202 on the surface 205 at an impinging angle, e.g., about 25 degrees. Similarly, the light beam from light source 250b illuminates the imaged area 202 on the surface 205 at an impinging angle of, e.g., about 10 degrees.

Figure 5A:
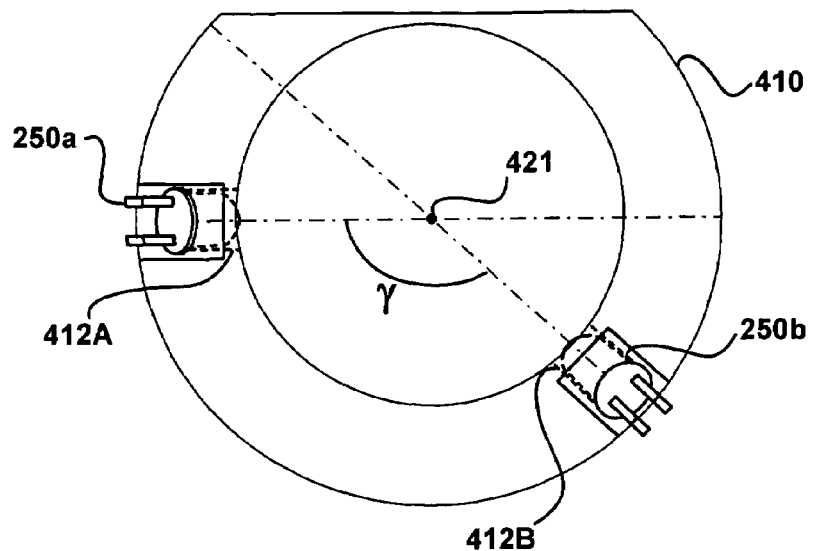
FIG. 5A is a top view illustrating light source location with respect to each other in one embodiment of a multi-light-source optical displacement detection system.
Figure 5B:
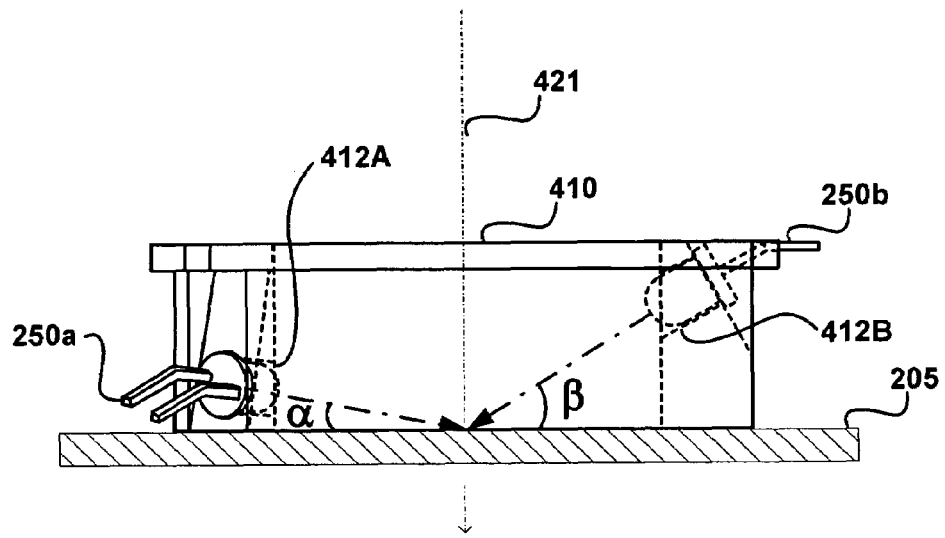
FIG. 5B is a side view illustrating light source location with respect to each other and with respect to a surface in one embodiment of a multi-light-source optical displacement detection system.

In this embodiment, light sources 250a and 250b are positioned across from each other, or at an angle γ of 180 degrees. In other embodiments, the location of the light sources 250 with respect to each other varies in order to increase flexibility of design and location of components within the optical system. For example, referring to FIGS. 5A and 5B, a top view and side view of an alternative embodiments of system 400 are shown. In FIGS. 5A and 5B several components are not shown for clarity. FIG. 5A shows light sources 250a and 250b depicted to illustrate their position with respect to each other. Angle γ between light source 250a and 250b is approximately 135 degrees. In this embodiment, the angle γ depends on the location of angular bores 412A-B, thus, angular bores 412A and 412B can be made anywhere around the central axis 421 of molded assembly 410. In other embodiments, angle γ can vary from 0 (as shown below with respect to in FIG. 7B) to 180 degrees as shown in FIG. 4. For comparison, FIG. 5B shows a side view perspective of one embodiment of system 400 illustrating the impinging angles α and β associated with each light source 250a and 250b respectively and the angle γ between the two light sources. It should further be noted that in embodiments having more than two light sources 250, several angles γ exist, one between each pair of light sources 250. For example, three or more angular bores (412A, 412B, 412C, ..., 412N) can be made around molded assembly 410 to receive three or more light sources (250a, 250b, ..., 250n) placed at angles γ ($\gamma_1, \gamma_2, \gamma_3, \ldots \gamma_k$) from each other. Similarly, each light source 250 can be associated with an impinging angle with respect to surface 205, however some of the light sources 250 may have the same impinging angle but differ in output wavelength.

Referring back to FIG. 4, an upper central bore 414U extends from the top of the molded assembly 410 and part way therethrough until it communicates with a lower central bore 414L. The lower central bore 414L extends through the bottom of the molded assembly 410, but is smaller in diameter than the upper central bore 414U so that the lower central bore 414L fits between the angular bores 412A-B, and is typically spaced symmetrically therebetween. The purpose of the central bore 414C is to provide a shutter or aperture for the sensor 460, and also to prevent stray light from reaching the sensor 460. A plate or window 416 is affixed by any suitable means to the bottom of the molded assembly 410. The plate 416 is of a color that does not interfere with the light emitted by the light sources 250, for example clear or transparent for red LEDs or any color that transmits IR light for infrared LEDs, and may be made of any suitable material which is also scratch resistant such as plastic or glass. The plate 416 can also be used as a lens to optically filter or focus light to increase the performance of the optical detection system 400. Further, as described below, in one embodiment, plate 416 is simply a section of a continuous underside 320, which is of a material and color that does not interfere with the optical path between light sources 250 and sensor 460.

The imaging lens 240 is positioned within the upper central bore 414U, which is typically sized to center the imaging lens 240 above the lower central bore 414L. An aperture plate 418, typically of substantially the same outer diameter as the upper central bore 414C, fits into the upper central bore 414U to fixedly position the imaging lens 240. The aperture plate 418 further includes a central bore 414C which communicates light passing through the imaging lens 240 to the sensor 460, positioned above the aperture plate 418. The central bore 414C may also be conical, with the narrower portion at the bottom. A retaining ring 420, which fastens to the top of the molded assembly 410 by any suitable means, such as clips or screws, maintains the relative positions of the sensor 460, aperture plate 418 and imaging lens 240.

The optical assembly 400 is positioned within the housing 310 of a pointing device so that the plate or window 416 can be positioned adjacent to a surface 205 to be imaged by the sensor 460, for example, a mouse pad, a tabletop, a ball, or other suitable surface. In one embodiment, as an optical mouse is moved over the surface 205, the light from one or more of the light sources 250 is directed through the plate 416 onto an illumination spot 201 on the surface 205, and in turn is directed through the plate 416, up through the lower central bore 414L and through the imaging lens 230. The imaging lens 230 then directs the reflected light to the sensor 460, which captures an image of the surface 205 for deriving movement data of the optical mouse with respect to the surface 205. While this exemplary embodiment has two light sources 250, alternative embodiments are possible with a plurality of light sources 250 each with some variation in one or more illumination characteristics, e.g., impinging angle, wavelength of light, homogeneity, intensity, and the like.

Figure 6A:
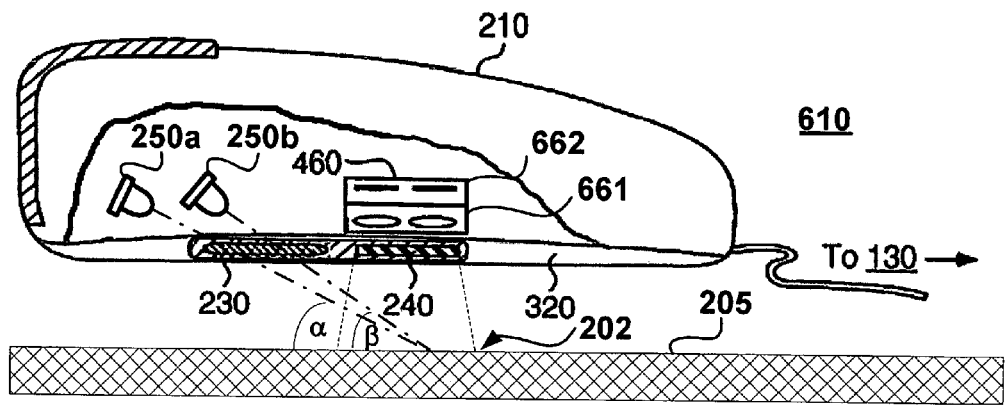
FIGS. 6A and 6B are illustrations of alternative multi-light-source optical pointing device embodiments.

Now referring to FIG. 6A, one embodiment of a multi-light-source optical pointing device 610 is shown. It should be noticed that with respect to this figure and FIGS. 6B, 6C, and 7, the mechanical components that actually hold the optical detection system 400 elements in place have been omitted for clarity but include other components, for example, components similar to the ones described with respect to FIG. 4. The purpose of these illustrations is to depict the positioning of particular elements with respect to each other, with respect to the general location within the pointing device 610, and with respect to the working or tracking surface 205. Although for clarity in these figures it is not indicated, when reference is made to the illumination subsystem it should be understood to be the assembly that includes the light sources 250 and illumination lens 230 as generally shown with respect to FIG. 2. Referring back to FIG. 6A, the imaged area 202, which generally includes the field of view of the sensor 460, is illuminated by all the impinging rays of electromagnetic energy emitted from the light sources 250a and 250b. The angular distribution of the rays from each light source 250 is called the angular spectrum. Angular spectrum width is different depending on the angular placement of the light sources 250 and associated illumination optics. Conventional illumination systems 210 typically include a single light source 250 or, in some systems, two light sources 250 placed at substantially the same impinging angle and turned on at the same time for increased illumination intensity.

Low impinging angle illumination systems (e.g., 7 to 10 degrees with respect to the imaged surface 205 ) are more sensitive to mechanical positioning errors of the components within the optical mouse 610 and provide lower amounts of scattered optical energy towards the imaging lens 240 and sensor 460. However, low impinging angle rays provide better performance when imaging low contrast surfaces 205, for example, white paper. In contrast, higher impinging angle illumination systems (e.g., approximately 25 degrees with respect to the imaged surface 205) provide better performance for imaging patterned surfaces, for example, wood. Low impinging angles refer to an angular spectrum of approximately between 5 and 15 degrees. Intermediate impinging angles refer to angular spectrums of approximately between 15 and 25 degrees. High impinging angles refer to angular spectrums of approximately between 25 and 45 degrees. These are approximate ranges and other impinging angles are possible but less likely to result in the type of performance improvements associated with embodiments of this invention.

Accordingly, referring back to the embodiment shown in FIG. 6A, light sources 250a and 250b are positioned at different impinging angles with respect to the imaged surface 205 providing two different angular spectrums or illumination angles. That is, light source 250a is position at a first angle α and light source 250b is position at a second higher angle β. Thereby, a displacement detection system according to this embodiment is able to perform optimally over low contrast surfaces by deriving optical electromagnetic energy from the low impinging light source 250b and over patterned surfaces by deriving the optical electromagnetic energy from the high impinging light source 250a. For one example on how the light sources 250 can be positioned at different impinging angles, refer back to FIG. 4.

It should be noted that any attachment mechanism can be used to position the light sources 250 at the desired impinging angle, however, to prevent misalignment performance degradation associated with low impinging angle light-sources, the attachment improvements described in co-pending U.S. patent application Ser. No. 10/122,488 (referenced above) can be used for this purpose. For example, in one embodiment, light sources 250 and sensor 460 are directly mounted on a lens subassembly including one or both of the imaging lens 240 and the illumination lens 230. The lens subassembly and the PCB are attached to each other. Further, light sources 250 can be used with different intensities to overcome the lower scattered energy reaching the optical sensor 460 from lower impinging angle light sources. In addition, although generally described with respect to the positioning of the light sources 250, the same variation in impinging angle can be attained by using different illumination lenses 230 having different refractive characteristics, as for example described in co-pending U.S. patent application Ser. No. 10/033,427, incorporated by reference above. Therefore, in one embodiment (shown in FIG. 6C), light source 250a and light source 250b are positioned at the same angle with respect to surface 205. However, illumination lenses 230a and 230b fold the light beams from each corresponding light source 250a and 250b to reach surface 205 at different impinging angles α and β.

Figure 6B:
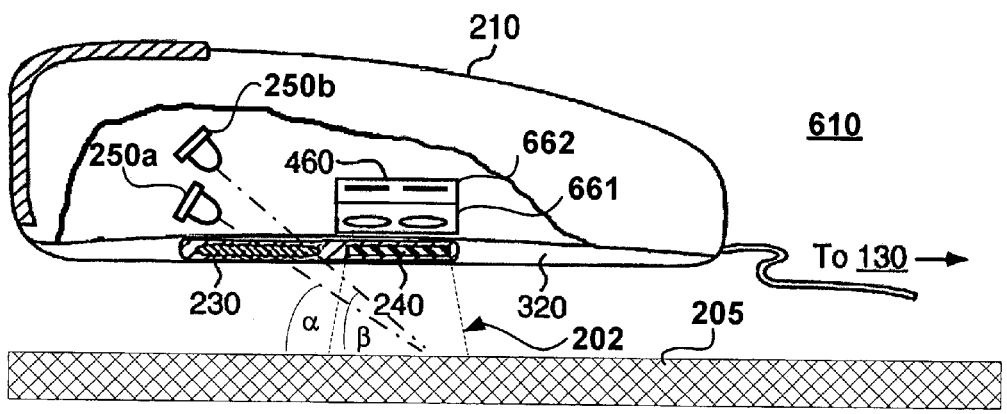

As discussed above, the position of each light source 250 with respect to each other could be varied to accommodate different internal configurations of light sources 250 and sensors 260. For example, with respect to a top view, light sources 250 can be placed at and angle γ from approximately 180 degrees (as shown in FIG. 4) to approximately 0 degrees (i.e. located vertically above each other). FIG. 6B shows one example of an embodiment of a multi-light-source pointing device 610 comprising two light sources 250a-b arranged with an angle γ of approximately 0 degrees. That is, light source 250a is located directly above light source 250b. Both of the light sources illuminate the illumination spot 201 but with different impinging angles α and β. Sensor 460 scans the imaged area 202 illuminated by one or both of the light sources 250a-b.

Another factor affecting optical sensing performance of optical displacement detection systems is the wavelength of the electromagnetic energy beam emitted by the light source 250 in the illumination subsystem 210. Electromagnetic energy wavelength is a factor that affects sensor performance differently depending on the surface 205 of operation. One reason for this variation is the different light scattering properties of different materials. Surface scattering characteristics are associated with several factors. For example, wavelength of the electromagnetic energy being scattered directly affects the scattering associated with a particular surface, e.g., infra red light is scattered differently than red light in some surfaces. In addition, sensor 460 performance is directly dependent on the wavelength of the light used for illumination. The quantum efficiency of the semiconductor material used in the components of the image capturing module 661 and the fabrication process to make those components determine, at least in part, the wavelength response of the sensor 460.

Light sources 250 used in illumination subsystems 210 for optical mice 110 include light emitting solid-state devices, such as LEDs, laser diodes, molecular/polymer organic light-emitting devices ("OLEDs"), and other sources of coherent and non-coherent light. Typically, these light sources are red laser or red non-coherent light LEDs with wavelengths ranging from about 620 nano-meters ("nm") to about 680 nm. Referring back to FIG. 6B, an embodiment of a multi-light-source optical pointing device 610 is shown with two light sources 250a and 250b in the illumination subsystem. The first light source 250a is a conventional red LED with a light beam wavelength of approximately 630 nm and the second light source 250b is a green LED with a light beam wavelength of approximately 500 nm, (generally from 498 nm to 508 nm). Additional light sources 250 may be used to increase detection performance of the optical system.

According to one embodiment of the present invention, light sources 250 are selected with different wavelengths, for example, about 400 nm to 470 nm (e.g., blue LED), about 525 nm (e.g., green LED), about 575 nm (e.g., yellow LED), about 750 nm to 875 nm (e.g., infrared ("IR") LED), or a combination thereof (e.g., white LED, multi-color LED, or the like). Using light sources 250 with different wavelengths provides a selection of alternative wavelengths for optimal detection performance over different surfaces 205. In one embodiment, a single multi-wavelength light source 250 capable of selectively emitting energy at different wavelengths is used. For example, a multi-color LED can be used, which includes several LED dies mounted on a lead frame and covered with clear epoxy resin. For the purposes of this description, using a multi-color LED is equivalent to using several light sources 250 with the same impinging angle.

Another embodiment of the present invention includes passive optical filtering or matching. Conventional passive filtering includes, for example, aperture variations and obstruction filtering on the imaging lens. Using passive filtering techniques the undesirable low spatial frequencies are removed by an obstruction in the imaging lens acting as a band pass filter. Other conventional passive filtering techniques can be used. For example, passive filtering or matching techniques are described for example in U.S. Pat. No. 6,256,016 to Piot et al. assigned to the same assignee as the present invention, incorporated herein by reference in its entirety.

Figure 6C:
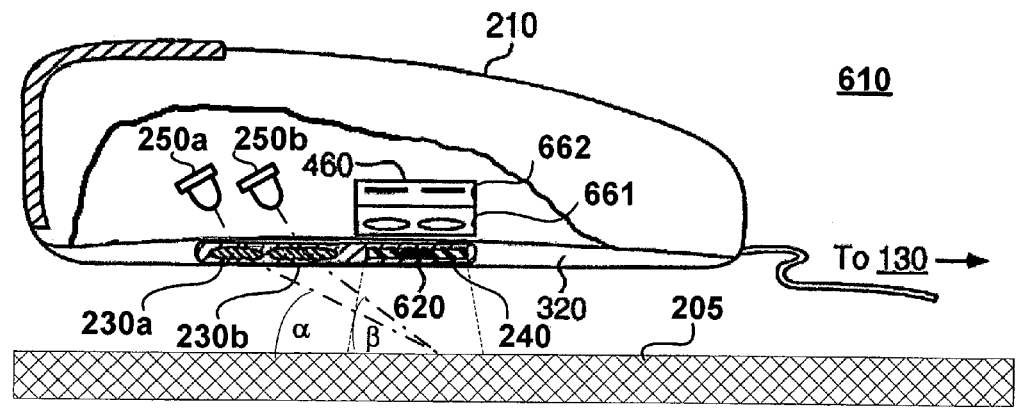
FIG. 6C is an illustration of one embodiment of a multi-light-source optical pointing device with an optical passive filter.

FIG. 6C shows one embodiment of a multi-light-source optical pointing device 610 that includes passive filtering. The illumination subsystem 210 includes two light sources 250a-b mounted at the same angle with respect to enclosure 210 (e.g., angle with respect to PCB (not shown) or underside 320). Further, the illumination subsystem includes two illumination lenses 230a and 230b, each associated with a corresponding light source 250a and 250b respectively. Illumination lenses 230a and 230b (e.g., truncated light pipe, wedge-shape, or the like) have different refractive properties and fold the light beam corresponding to their associated light sources 250a and 250b to a different impinging angle α and β. The first light source 250a is a conventional red LED with a light beam wavelength of approximately 630 nm and the second light source 250b is a green LED with a light beam wavelength of approximately 525 nm, (generally from 498 nm to 540 nm). Further, the imaging lens 240 includes an obstruction 620 in the center that prevents lower frequencies of scattered light from reaching the image-capture module 661 of light sensor 460.

Figure 7:
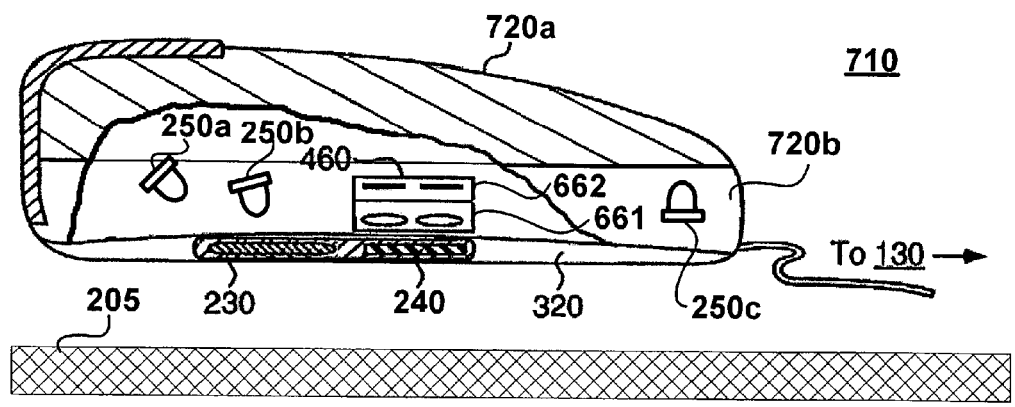
FIG. 7 is an illustration of one embodiment of a multi-light-source optical pointing device with multiple illumination functions.

Now referring to FIG. 7, a multi-light-source optical pointing device 710 is shown. Light sources 250a and 250b are IR LEDs. The illumination lens 230 (e.g., a plate) is made with a translucent black plastic material, similar to the plastic material found in computer IrDA ports, stereo equipment remote controls, and the like. Each light source 250 is mounted at a different impinging angle. Sensor 460 includes an image-capture module 661 with IR electromagnetic energy sensing devices or modules such as those used in conventional IR sensors, for example, active pixel arrays, photodiode arrays, or the like. For example, in one embodiment, the electromagnetic energy sensing module in the image-capture module 661 is a light sensor tuned for an optimal gain response at IR wavelengths. An alternative embodiment includes a passive filter 620 on imaging lens 240 as, for example, shown in FIG. 6C. In this embodiment, the light, or electromagnetic waves, from the IR LEDs 250 are not visible to the human eye. It should be noted that for purposes of this description, electromagnetic energy having wavelengths within or near the visible spectrum, e.g., approximately 100 nm to 1000 nm, are generally referred to as light, which includes at least all colored light, and infrared "light."

As previously mentioned, optical mice users have grown accustomed to determining an operational status of the optical mouse by simply looking at the light emanating from the light source 250. Accordingly, FIG. 7 shows one embodiment of an optical mouse that includes two light sources 250a-b in the illumination subsystem that are IR LEDs. In addition, the optical mouse 710 includes an additional signaling light source 250c (e.g., a red LED) mounted within the optical mouse enclosure 720. The enclosure 720 has two portions, a top portion 720a and a bottom portion 720b. The bottom portion or underside 720b is made of a translucent material that allows the light from the signaling light source 250c to shine through. In one embodiment, the underside 720b is made of a plastic colored with IR compatible coloring pigment. The signaling light source 250c is configured in the assembly of the optical mouse so that its light is injected through mechanical parts diffusing the light without perturbing the IR optical paths between light sources 250a-b and sensor 460.

In an alternative embodiment, a light pipe (not shown) assembled with the signaling light source 250c directs its light away from the sensor 460 of the optical system. Alternative means to prevent interference with the optical system include passive filtering as described above. The light from the signaling light source 250c provides the user-feedback function without disturbing the optical paths of the IR LEDs 250a-b and the sensor 460. For this purpose, the signaling light source 250c generates electromagnetic energy of a wavelength within the visual range of the electromagnetic energy spectrum, i.e., it is a color LED.

Although red is a preferred color, any color can be used for the signaling light source 250c. Further, in alternative embodiments, multiple signaling light sources are also used to provide different visual signals to the user. For example, a wireless optical mouse includes two IR LEDs (250a and 250b) in the illumination subsystem for illuminating the imaged area and for the sensor 460 to detect displacement. In addition, a red LED is used as a signaling light source 250c to indicate normal operation and second signaling light source 250d is a yellow LED used to indicate that the wireless mouse has been moved outside the reach of the wireless link. As an additional example, a "bargraph" made of light pipe and signaling LEDs is used to indicate the status of batteries in a cordless mouse. Many other operational status signals can be indicated using a combination of signaling light sources.

An additional benefit of using signaling light sources 250 of multiple colors is that manufacturers can use light colors to distinguish their products for different product lines or from competitors. This beneficial feature extends to the use of multiple visible colors in the light sources 250 of the illumination subassembly. For example, a manufacturer can use a blue LED for wireless optical mice, a red LED for corded optical mice, and the like.

Further, it should be noticed that one advantage of using IR LEDs for the illumination subassembly 210 is that the color scheme of optical mice can be extended to the lenses or plates on the underside surface 320 (or bottom side) of the pointing devices. For example, the lenses can be of any color (blue, red, black, or the like) attainable with an IR compatible coloring pigment since the color of the lens does not interfere with the IR optical path; the IR light (or electromagnetic waves) can pass through a lens colored with IR compatible pigments without interference. Further, in one embodiment, the underside surface 320 is a continuous surface without any opening but transparent to the wavelength of the electromagnetic energy emitted by the light sources 250 in the illumination subsystem 210.

Therefore, the distinguishing or decorative features of the mouse can also include the color of the lenses and enclosure without interfering with the functionality of the pointing device. Another advantage of using IR LEDs as light sources 250 in the illumination subassembly 210 is that the imaging lens 240 does not need to be modified for different color signaling light sources. For example, an IR band-pass filter in the imaging lens would block interference from all visible light sources, thus, the same optical system can be used with optical mice models using different colors for their decorative or user signaling light sources.

Figure 8A:
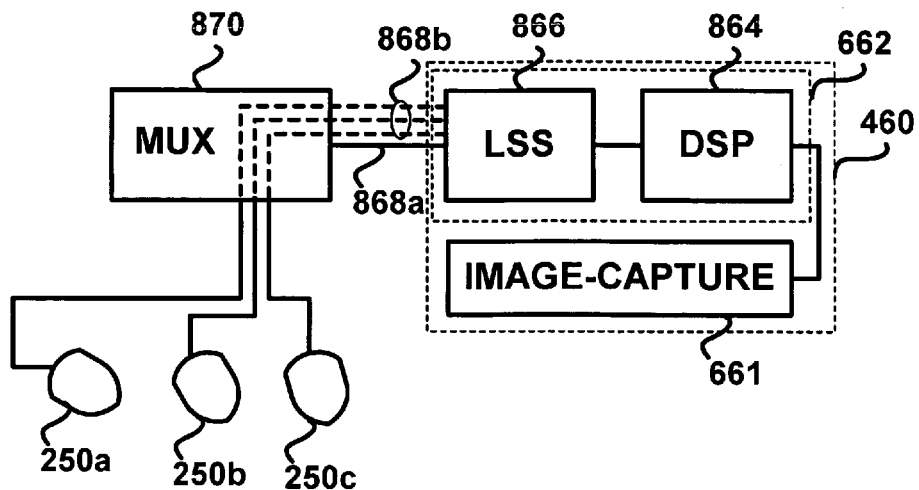
FIGS. 8A and 8B are system block diagrams of alternative embodiments of displacement detection systems according to the present invention.
Figure 8B:
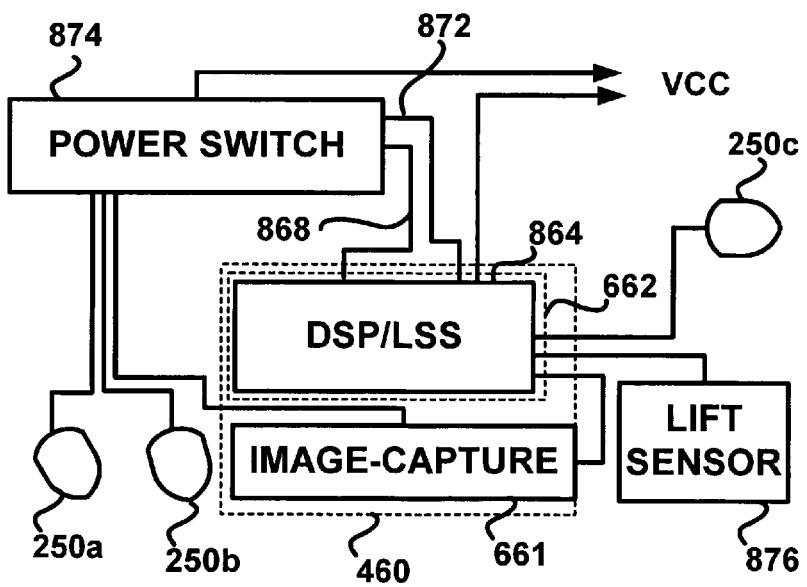

Now referring to FIGS. 8A and 8B, system block diagrams of alternative embodiments of displacement detection systems 400 according to the present invention are shown. With respect to the embodiments described above, the sensors 460 are improved sensors made, for example, by modifying conventional sensors 260 to include a light source selection module 866 for operation as described below. Embodiments that include IR LEDs in the illumination subassembly 210 also include IR capable image-capture modules 661 in the sensor 460.

Now referring to FIG. 8A, one embodiment of a displacement detection system 400 includes a sensor 460 with several electrically coupled modules. Sensor 460 includes an image-capture module 661 coupled to a control logic module 662. The image-capture module 661 includes one or more electromagnetic energy sensing modules or devices, such as for example, photodiodes, active pixel arrays, or the like. The control logic module 662 includes a DSP module 864 and a light-source-selection ("LSS") module 866. The physical assembly of these functional blocks is flexible. For example, in one embodiment the sensor 460 is a single die with circuitry embodying the image-capture module 661 and digital logic circuitry embodying the DSP module 864 and the light source selection module 866 packed in a chip carrier. In another embodiment, multiple dice having circuits for each module are packaged in a same chip carrier, which embodies the sensor 460. In another embodiment, each module is a separate chip mounted on a PCB. Further, in some embodiments, the sensor 460 includes one or more light sources 250 as LED circuits within the same package. As mentioned above, the modules performing controller functions for the sensor 460 are referred to as the control logic module 662 whether they are in a separate controller devices or in sections of the a single die. This includes the DSP module 864 and the LSS module 866, which can also be embodied as additional logic functions in the DSP module 864 as described below.

In one embodiment, the sensor 460 is modified by changes to the control logic module 662 to include the LSS module 866 in addition to a DSP module 864. For example, one method to modify a sensor 460 is by reprogramming the firmware associated with the control logic module 662 to include new code embodying the new improved functionality as a light source selection module 866. Other minor changes may include addition of conventional input/output ("I/O") control or signaling lines 868 for switching and receiving input signals as described below. For example, referring to FIG. 8A, the sensor 460 may include output lines 868 associated with the LSS module 866. In one configuration, the LSS module 866 is connected to a multiplexer 870 ("MUX") via a serial control line 668a. A bit pattern in the control line 868a identifies a signal path in the MUX 870 to turn one or more of the light sources 250a, 250b, and 250c. Alternatively, the LSS module 866 is connected to each light source 250a-250c with a separate control line 868b so that the sensor 460 directly controls which light sources 250 are turned on at any given time.

FIG. 8B shows an alternative embodiment of displacement selection system 400. This feature-enhanced embodiment includes a sensor 460 with an image-capture module 661 and a control logic module 662. The control logic module 662 includes a DSP/LSS module 864. In this embodiment, the DSP module 864 includes LSS circuitry and code. Further, the DSP module 864 includes a power management algorithm. The DSP module 864 controls connections to the power supply VCC of different components via a power control output line 872 that connects to a power switch 874. Power switch 874 connects to power supply VCC and includes digital switches to selectably provide power to system components, for example, light sources 250, image-capture module 661, and the like. In addition, DSP/LSS module 864 controls light source selections via a light source selection signal through an output control line 868 that connects to the power switch 874. Further, system 400 includes a lift detection mechanism 876 ("lift sensor") that provides a lift detection signal to DSP/LSS module 864. Lift detection mechanisms 876 can include the sensor 460 itself detecting a failure to track (e.g., an abrupt change in images of the surface, a continued out of focus image, or the like). Other lift detection mechanisms 876 include optical barriers (e.g., a light barrier with the tracking surface 205 acting as the "reflector"), Reed switch contact and magnet assemblies, a push switch in contact with the working surface, contact ball switch (e.g., balls remain in contact up to a threshold lift angle when they separate and open the circuit), or the like. The input lift detection signal is used, for example, as an input to the power management algorithm, light source selection algorithm, or the like. In addition, DSP/LSS module controls, either directly (as shown) or optionally through power switch 874 the operation of a signaling light source 250c to provide information to the user, for example, power state, lift condition, or the like.

According to one embodiment, a sensor's control logic 662 determines the performance index for an illumination subsystem 210 from measurements made from images of a surface 205. The performance index depends on the surface characteristics (e.g., high contrast, textured, reflective properties, and the like), feature detection (e.g., how many pixels have different values), intensity of reflected light, and the like.

Figure 9A:
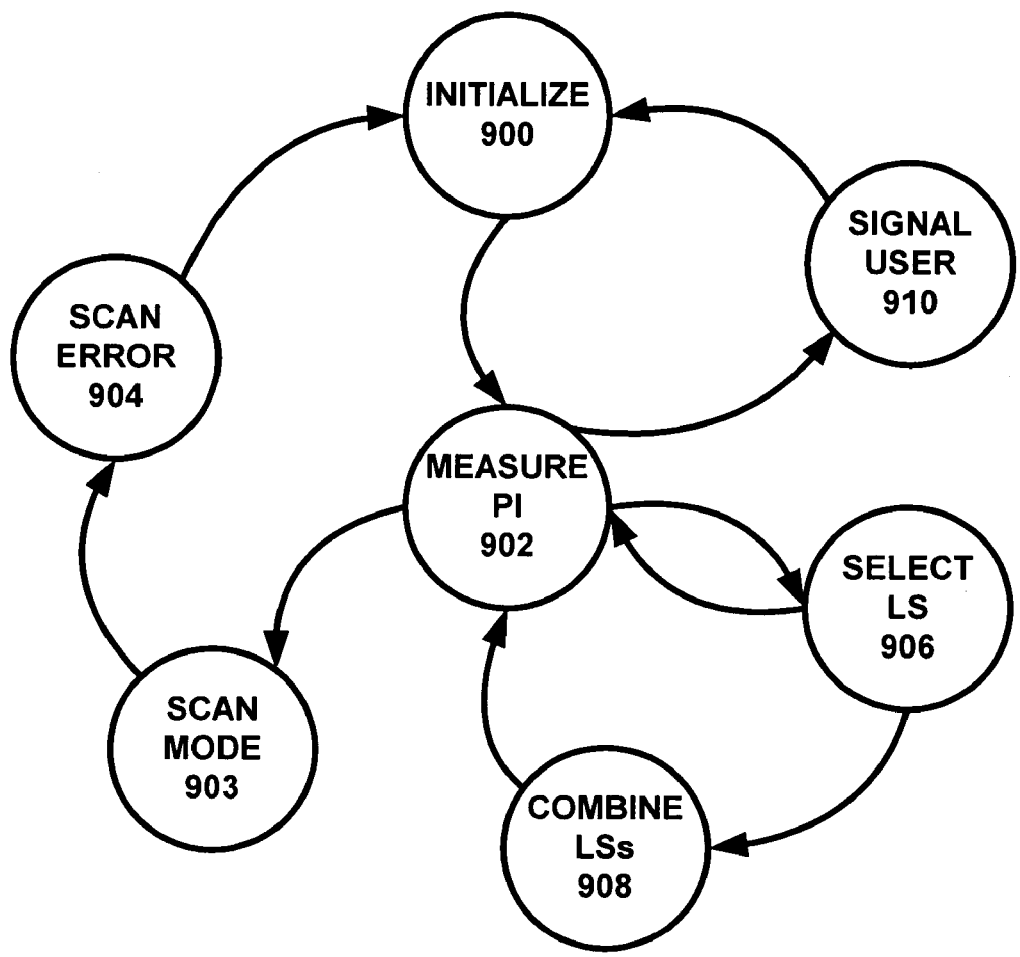
FIGS. 9A and 9B are a state diagram and a flow chart of one embodiment of a method for selecting light sources in an optical system.
Figure 9B:
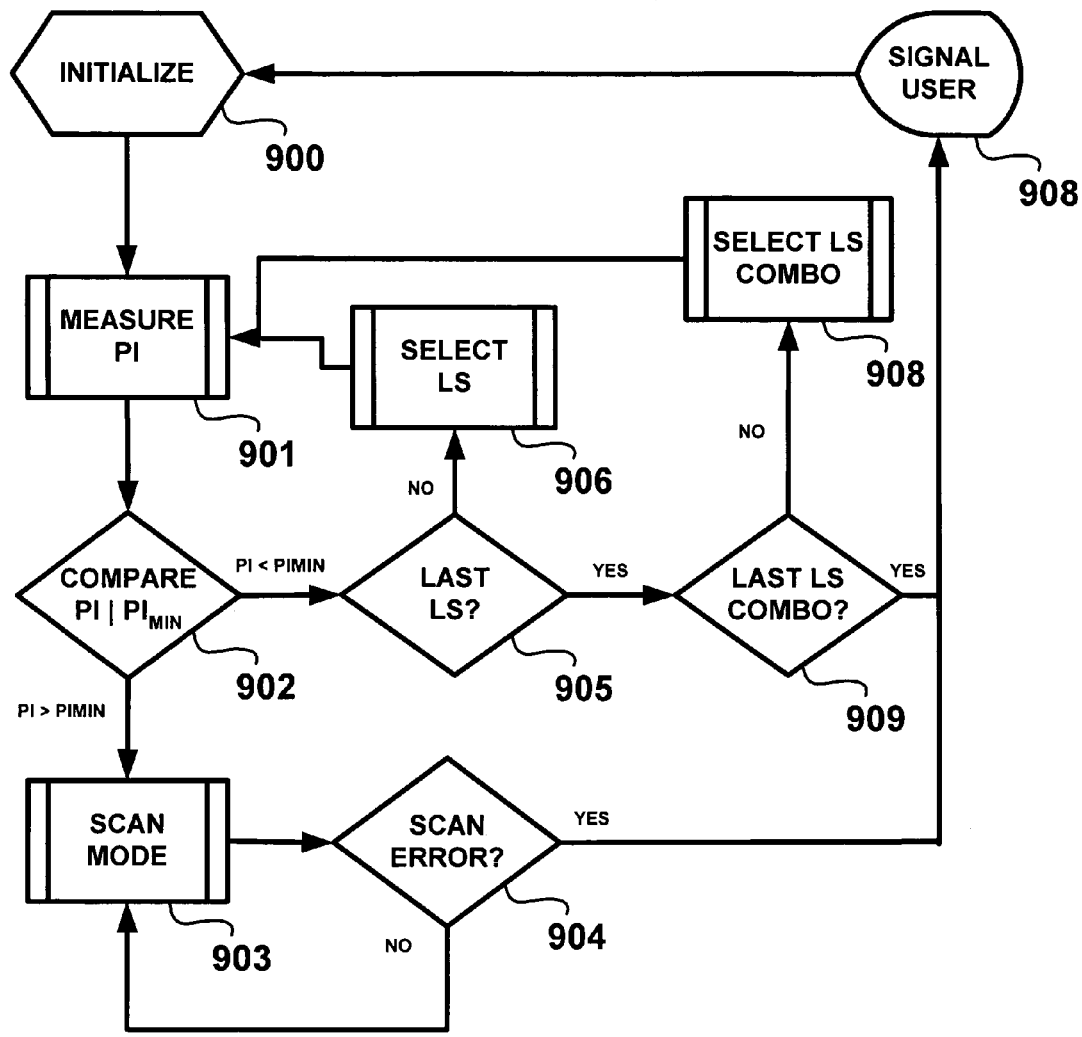

Now referring to FIGS. 9A and 9B, a state diagram and a corresponding flow chart for one embodiment of a method to control light source selection in a multi-light-source optical system are shown. The control logic 662 initializes 900 in a conventional manner. The initialization 900 includes the selection of a light source 250, for example, the last light source used, a random light source, or the like. Then the performance index ("PI") is measured 901 for the light source selected. The performance index is compared 902 with a minimum performance index ("$PI_{MIN}$") stored in a memory or otherwise hard-coded into the firmware. If the measured PI is higher than the $PI_{MIN}$, then the scanning mode is entered 903. Scanning mode 903 refers to conventional sensor functions related to image acquisition or capture for displacement detection. If an operational error is detected 904, the control logic 662 returns to the initialization 900 function. Conventional operational errors are detected when the image data from the sensor does not produce valid movement data, for example when an optical mouse is lifted off the working surface.

Alternatively, if the measured PI is not greater than the $PI_{MIN}$, the control logic 662 checks 905 for further light sources 250. If there are other light sources 250, the control logic 662 switches 906 to another light source 250. That is, another light source 250 is turned on and the previous light source is turned off. After the next light source is turned on, the PI is again measured 901 and compared 902 with the $PI_{MIN}$. Since each light source 250 has different illumination characteristics, e.g., different wavelength, impinging angle, intensity, homogeneity, or a combination thereof, the PI for each light source will vary depending on the surface over which the system is operating. This switching process repeats until a PI is measured greater than $PI_{MIN}$ or no more light sources 250 are available.

An optional feature in one embodiment includes the permutation of different combinations of light sources 250 after each individual light source has failed to provide an adequate PI. A first combination of light sources ($LS_1 = \{ls_i, ls_j, \ldots, ls_n\}$) is selected 908 (i.e., turned on). Their combined PI $$\left( PI_{LS1} = \sum_{a=i,j,\ldots,n} PI_{ls_a} \right)$$

is measured 901, and compared 902 with the $PI_{MIN}$. If the measured PI is not acceptable (i.e., $PI_{LS1} < PI_{MIN}$), another combination of light sources ($LS2 = \{ls_k, \ldots, ls_m\}$) is selected 908 until a proper combination of light sources ($LS_P$, $PI_{LSP} > PI_{MIN}$) provides an acceptable PI or no other combinations are left 909.

If neither the individual light sources nor their optional combination yields an adequate PI, the user is notified 910 of the problem. For example, the user can be informed that the optical sensor system cannot properly perform and that a new surface should be used. In one embodiment, the user is notified with a flashing visible signaling LED that alerts the user to work over a different surface. In another embodiment, a pop up window is shown in the computer system display with a written message. After notifying the user 910, the control logic 662 returns to the initialization procedure 900.

Preferably, the initialization procedure 900 includes a power saving scheme. One power saving scheme is described in U.S. patent application Ser. No. 09/709,046, entitled "Wireless Optical Input Device" (filed Nov. 9, 2000), to Arrigo et al., which is commonly assigned to the assignee of the present invention and is incorporated herein by reference in its entirety. The power saving scheme is modified to include a counter that detects how many times the controller loops through the light source selection process without detecting an acceptable PI. After a number loops through the entire selection procedure, e.g., three loops, the controller sets the optical system to a power saving mode. This situation takes place, for example, if a mouse is left facing up, or is being used over a non-suitable surface, or otherwise not in contact with an appropriate working surface.

Further, in one embodiment, the control logic 662 receives an input from a lift detection mechanism 876. Upon receiving a lift detection signal, the control logic 662 sets the optical sensor 460 in a power savings mode, for example, by turning off power to one or more modules (e.g., image-capture module 661). In addition, the control logic 662 turns on a signaling LED to indicate the "lift condition" to the user. The control logic 662 includes the required I/O lines to receive the lift detection signal and for switching on the signaling light source (e.g., a red LED) to inform the user. These power savings features beneficially provide power savings by turning off components when they are not likely to be required, i.e., when the mouse is lifted it is not likely to be in use. Reducing power consumption is important and very beneficial in battery operated devices, for example, in cordless optical mice.

Figure 10A:
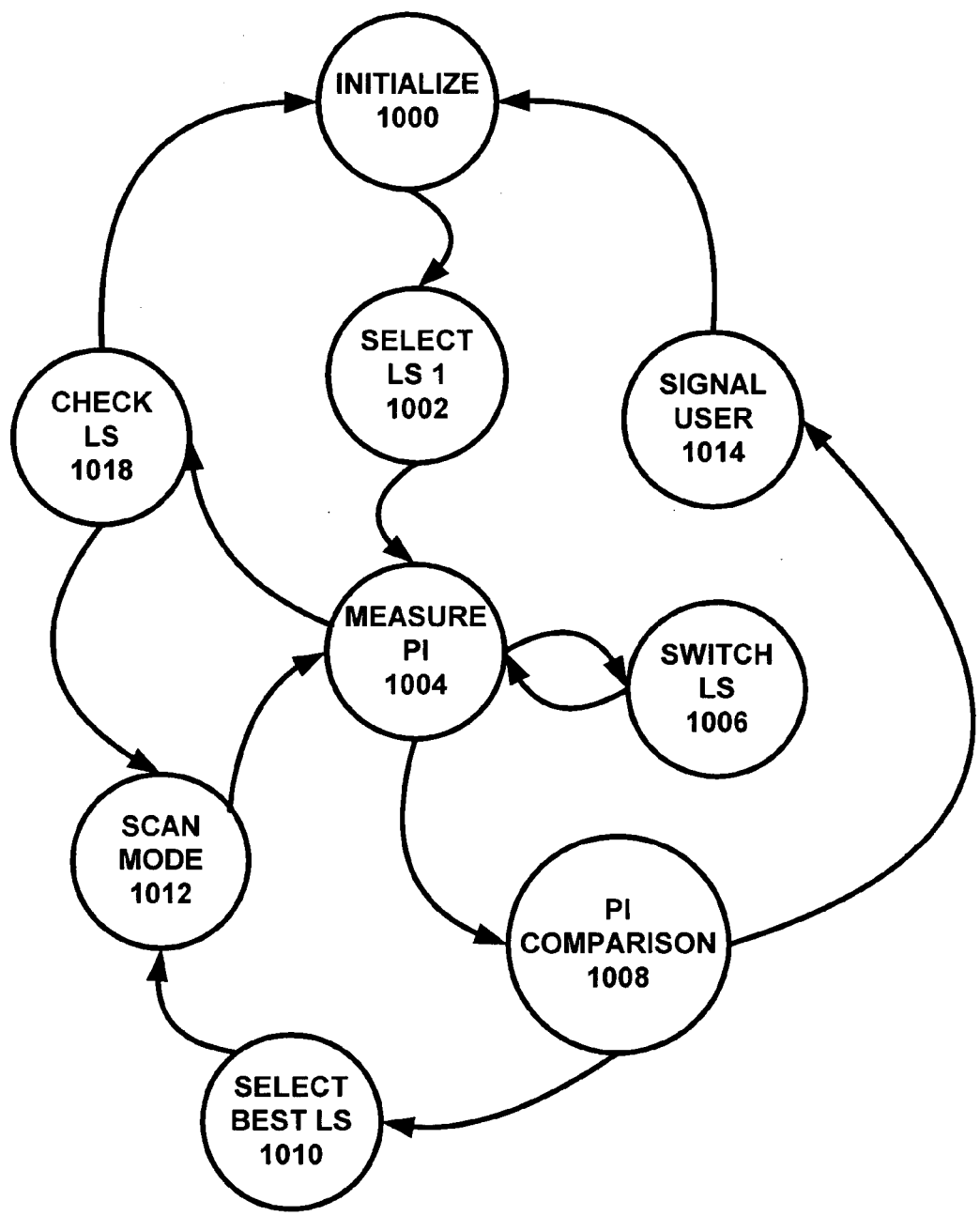
FIGS. 10A and 10B are a state diagram and a flow chart of an alternative embodiment of a method for selecting light sources in an optical system.
Figure 10B:
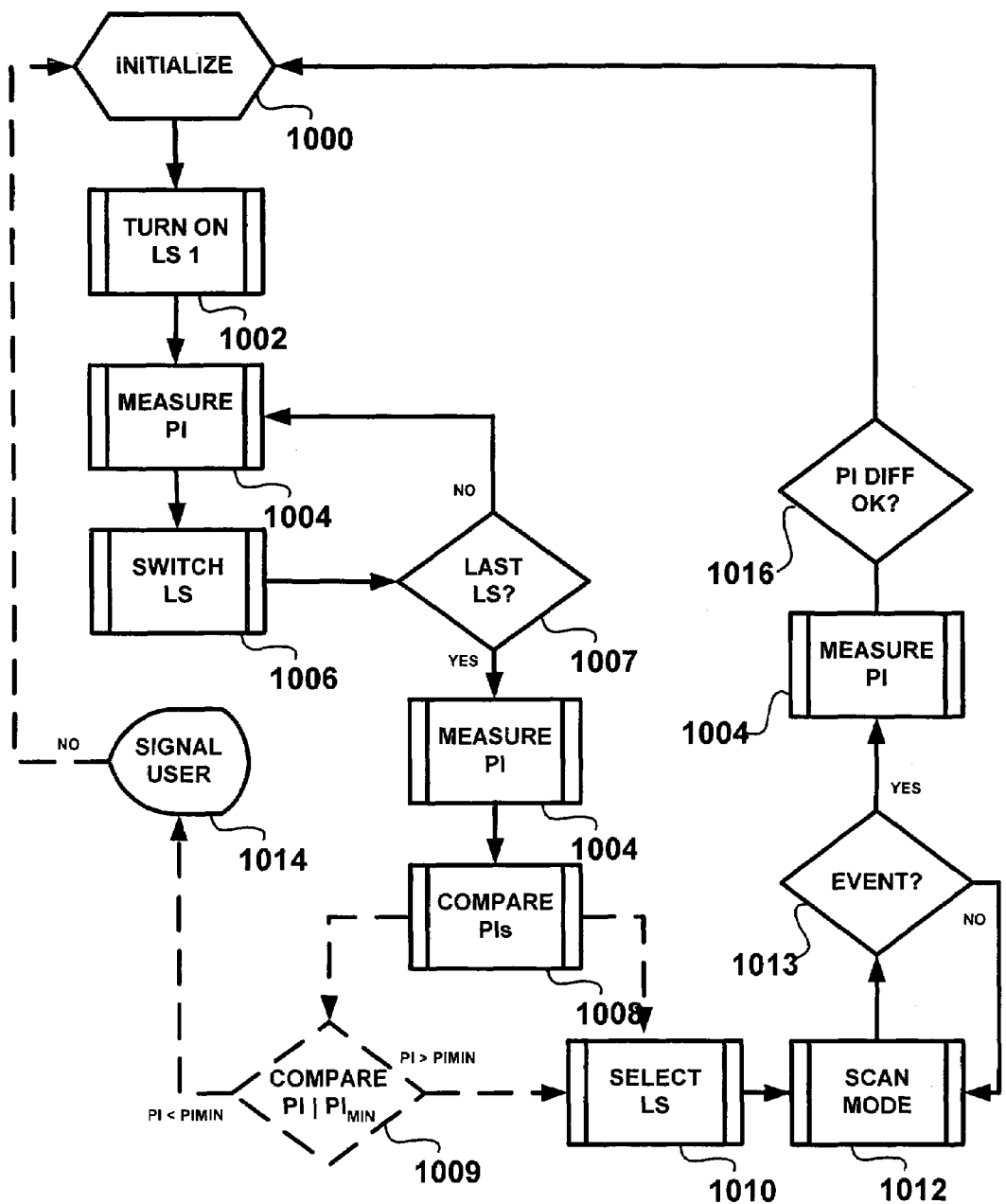

Now referring to FIGS. 10A and 10B, a state diagram and a corresponding flow chart for an alternative embodiment of a method to control light source selection in a multi-light-source optical system are shown. The initialization 1000 includes similar functions described above. However, in this embodiment, the same first light source is initially selected 1002. The PI of the first light source is measured 1004 and the next light source is selected 1006. After checking 1007 whether the last light source 250 has been selected, the PI for the current light source 250 is measured 1004. This process is repeated selecting all the available light sources 250, for example, in a round-robin fashion, and measuring all their corresponding PIs. Once all the PIs have been measured, they are compared 1008 with each other and the highest PI is selected. It should be noted that an alternative embodiment compares two PIs at a time after each measuring 1004 step and the highest PI of the two is stored. Once all the PIs have been measured and compared in this manner, the stored PI is the highest of all the PIs. Optionally, the highest PI is compared 1009 against a stored $PI_{MIN}$ as described above. If the highest PI is not adequate (e.g., highest PI is less than $PI_{MIN}$), the user is notified 1014, and the control logic returns to the initialization 1000 step.

If the highest PI is adequate (e.g., highest PI is greater than $PI_{MIN}$), or if no $PI_{MIN}$ comparison 1009 is made, the light source 250 corresponding to the highest PI is determined to be the best light source for illumination of the current surface and it is selected 1010 for illumination. With the selected light source 250, conventional sensor scanning 1012 begins. In one embodiment, during the scanning process, an event or condition check 1013 is repeatedly made to determine whether the current light source performance should be checked. For example, the condition check can be made 1013 to determine if a lift condition has been detected, or a predetermined time interval has elapsed, or for detection of any other condition that may indicate a change in the surface of operation. If the event check 1013 determines that the current light source needs to be checked, the PI is measured 1004 and it is compared 1009 with the stored $PI_{MIN}$. In an alternative embodiment, the PI is measured and compared 1016 with the previously measured highest PI. If the current light source is not adequate any longer, e.g., the current PI is lower than $PI_{MIN}$ or the difference is above a predetermined maximum difference, the control logic returns to the initialization 1000 step.

Alternative algorithms can be used for the control logic 662 to select light sources 250, for example, based on measurements of any subset of the performance index indicators, e.g., reflection intensity, contrast, number of features on the working surface, or the like.

While particular embodiments and applications of the present invention have been illustrated and described, it is to be understood that the invention is not limited to the precise embodiments disclosed herein. One of skill in the art will readily recognize from the following discussion that alternative embodiments of the structures and methods disclosed herein may be employed without departing from the principles of the present invention disclosed herein. These modifications and variations may be made in the arrangement, operation and details of the method and apparatus of the present invention disclosed herein without departing from the spirit and scope of the invention as defined in the appended claims.

What is claimed is:

1. In an optical pointing device for use with a computer system, an optical displacement detection system comprising:
   a sensor assembly having an electromagnetic energy sensing module and a control logic module, the electromagnetic energy sensing module configured to scan an imaged area to capture images of a surface; and
   a plurality of light sources, each of the plurality of light sources configured to have at least one unique illumination characteristic, the plurality of light sources configured to emit electromagnetic energy to illuminate the imaged area upon selection by the control logic module of the sensor, wherein the at least one unique illumination characteristic includes one of a group consisting of a wavelength, a light homogeneity, and a light intensity.

2. The optical displacement detection system of claim 1, wherein at least one of the plurality of light sources is an infrared LED.

3. The optical displacement detection system of claim 1, wherein at least two of the plurality of light sources are packaged together in a single package.

4. The optical displacement detection system of claim 3, wherein the at least two of the plurality of light sources are included in a multi-wavelength LED.

5. The optical displacement detection system of claim 1, wherein the control logic comprises a light selection module coupled to the plurality of light sources, the light selection module configured to select one or more of the plurality of light sources for emitting electromagnetic energy to illuminate the imaged area.

6. The optical displacement detection system of claim 1, wherein the electromagnetic energy sensing module is a light sensor with optimal gain response at infrared wavelengths.

7. The optical displacement detection system of claim 1, wherein the optical pointing device is one of an optical mouse or an optical trackball.

8. An optical pointing device for use in a computer system comprising:
   a sensor assembly having a light sensor optically coupled with an imaging lens and electrically coupled with a control logic circuit, the light sensor configured to receive electromagnetic energy from an imaged area of a surface and configured to derive displacement information with respect to the surface by comparing a plurality of images of the surface captured over a period of time; and
   an illumination assembly having a plurality of light sources, each light source configured to generate an electromagnetic energy beam to illuminate the imaged area, and each light source associated with at least one unique illumination characteristic.

9. The optical pointing device of claim 8, wherein the illumination characteristics include at least one of the group consisting of a wavelength, a light intensity, a beam homogeneity, and an impinging angle.

10. The optical pointing device of claim 8, wherein the control logic circuit is configured to select one or more light sources from the plurality of light sources for illuminating the imaged area based on a measured performance index associated with the surface.

11. The optical pointing device of claim 9, wherein the control logic circuit includes an output line coupled to a power switch, the power switch configured to turn on a selected one or more light sources of the plurality of light sources as indicated on a selection signal received through the output line from the control logic circuit.

12. The optical pointing device of claim 8, wherein the imaging lens comprises a passive filter.

13. The optical pointing device of claim 8, wherein at least one of the light sources is an infrared LED.

14. The optical pointing device of claim 13, wherein the imaging lens comprises a passive filter configured to filter out non-infrared electromagnetic energy to prevent it from reaching the sensor.

15. The optical pointing device of claim 8, wherein at least two of the plurality of light sources are packaged together in a single package.

16. An optical pointing device for use in a computer system, the optical pointing device comprising:
    a sensor assembly having a sensor optically coupled with an imaging lens and electrically coupled with a control logic circuit, the sensor configured to receive electromagnetic energy scattered from an imaged area of a surface and configured to capture a plurality of images over a period of time, the control logic circuit configured to derive pointing device movement data by comparing the plurality of images of the surface captured over a period of time;
    an illumination assembly having a first light source configured to illuminate the imaged area; and
    a signaling light source positioned within the optical pointing device to prevent interference with an optical path between the illumination assembly and the sensor assembly, the signaling light source configured to be visible to a user.

17. The optical pointing device of claim 16, wherein the illumination assembly further comprises at least a second light source, the second light source having a different illumination characteristic than the first light source.

18. The optical pointing device of claim 17, wherein the control logic circuit includes a light source selection module configured to select one of the first light source or the second light source for generating electromagnetic energy to illuminate the imaged area.

19. The optical pointing device of claim 16, wherein the first light source is an IR LED and the signaling light source is one of a color LED or an organic LED display.

20. The optical pointing device of claim 16, wherein the first light source is an IR LED and the signaling light source is a color LED configured to emit light of a color from the group consisting of red, blue, green, yellow, and white.

21. The optical pointing device of claim 16, wherein the signaling light source is coupled to a light pipe configured to guide light generated at the signaling light source towards the exterior of the optical pointing device, and further configured to prevent interference from the light generated at the signaling light source with the optical path.

22. The optical pointing device of claim 16, further comprising a second signaling light source, the first and second signaling light sources for communicating visual operation status messages to the user.

23. A sensor for use in an optical displacement detection system comprising:
    an image capture module configured to capture electromagnetic energy associated with an imaged area to produce a set of images of the imaged area captured over a period of time;
    a digital signal processing module, electrically coupled to the image capture module to receive image data, the signal processing module configured to derive displacement information from differences between the images of the imaged area captured over a period of time; and
    a light source selection module, coupled to the digital signal processing module and to a switch selection output line, the light source selection module for producing a light source selection signal in response to a performance index measurement.

24. The sensor of claim 23, wherein the image capture module is configured to capture infrared electromagnetic energy.

25. The sensor of claim 23, further comprising a power management module coupled to the light sensor selection module for reducing power consumption of the optical displacement detection system in response to the digital signal processing module determining no movement from the displacement information.

26. The sensor of claim 23, wherein the image capture module, the digital signal processing module, and the light sensor selection module are packaged in a single chip carrier.

27. The sensor of claim 23, further comprising an imaging lens, the imaging lens coupled with the image capture module and further including a passive optical filter.

28. A method of selecting one or more light sources for illumination of an imaged area in a multi-light-source optical displacement detection system comprising a plurality of light sources, the method comprising:
    measuring a first performance index associated with a first light source;
    selecting an adequate light source based, at least in part, on the measured first performance index; and
    scanning the imaged area with light originating from the selected adequate light source.

29. The method of claim 28, wherein selecting the adequate light source includes comparing the measured performance index with a minimum performance index.

30. The method of claim 28, wherein measuring the performance index includes determining at least one of a reflection intensity, a contrast, or a number of features on a working surface.

31. The method of claim 28, further comprising measuring a second performance index associated with a second light source and wherein selecting includes comparing the first performance index with the second performance index.

32. The method of claim 28, further comprising:
    measuring the first performance index in response to the occurrence of a predetermined event;
    determining a variation in the first performance index;
    selecting an alternate adequate light source having an associated higher performance index than a last measured first performance index in response to the variation of the first performance index exceeding a maximum variation; and scanning the imaged area with light originating from the selected alternate adequate light source.

33. The method of claim 32, wherein the predetermined event includes at least one of the group consisting of a passing of a time period, a lift detection, and a scan data processing error.

34. The method of claim 28, further comprising:
measuring the first performance index in response to the occurrence of a predetemined event;
determining a variation in the first performance index that exceeds a maximum variation value;
measuring a set of performance indexes associated with each of the light sources of the plurality of light sources and farther associated with a combination of sets of light sources;
selecting an alternate adequate set of light sources having a highest associated performance index amongst the set of performance indexes; and
scanning the imaged area with light originating from the selected alternate adequate set of light sources.

35. A method of selecting one or more light sources for illumination of an imaged area in a multi-light-source optical displacement detection system comprising a plurality of light sources, the method comprising:
turning on a first light source;
measuring a first performance index associated with the first light source;
switching to a second light source;
measuring a second performance index associated with the second light source;
comparing the first performance index with the second performance index to determine a best performance index;
determining a best light source associated with the highest performance index;
selecting the best light source for illuminating during scanning of the imaged area.

36. A light source selection module for selecting one or more light sources for illumination of an imaged area scanned by a multi-light-source optical displacement detection system comprising a plurality of light sources, the light source selection module comprising:
means for measuring a first performance index associated with a first light source;
means for selecting an adequate light source based, at least in part, on the first performance index; and
means for scanning the imaged area with light originating from the selected adequate light source.

37. In an optical pointing device for use with a computer system, an optical displacement detection system comprising:
a sensor assembly having an electromagnetic energy sensing module, the electromagnetic energy sensing module configured to scan an imaged area to capture images of a surface;
a plurality of light sources, each of the plurality of light sources at a different angle relative to the z-axis, the plurality of light sources configured to emit electromagnetic energy to illuminate the imaged area; and
a control logic module communicatively coupled to the sensor assembly for selecting which of the plurality of light sources to use.

38. The optical displacement detection system of claim 37, wherein a first of the plurality of light sources is configured to emit electromagnetic energy at a first angle relative to the z-axis by positioning the first of the plurality of light sources at a first angle with respect to the imaged area and wherein a second of the plurality of light sources is configured to emit electromagnetic energy at a second angle relative to the z-axis by positioning the second or the plurality of light sources at a second angle with respect to the imaged area.

39. The optical displacement detection system of claim 38, wherein the first impinging angle is of substantially 80 to 83 degrees and the second impinging angle is a high impinging angle of substantially 45 to 65 degrees.

40. The optical displacement detection system of claim 37, wherein a first of the plurality of light source is configured to emit electromagnetic energy at a first angle relative to the z-axis by associating the first of the plurality of light sources with a first illumination lens configured to fold rays of the electromagnetic energy to the first angle and wherein a second of the plurality of light sources is configured to emit electromagnetic energy at a second angle relative to the z-axis by associating the second of the plurality of light sources with a second illumination lens configured to fold rays of the electromagnetic energy to the second angle.

* * * * *

UNITED STATES PATENT AND TRADEMARK OFFICE
CERTIFICATE OF CORRECTION

| | | |
|---|---|---|
| PATENT NO. | : 7,439,954 B2 | Page 1 of 1 |
| APPLICATION NO. | : 10/826424 | |
| DATED | : October 21, 2008 | |
| INVENTOR(S) | : Olivier Theytaz et al. | |

It is certified that error appears in the above-identified patent and that said Letters Patent is hereby corrected as shown below:

In column 14, line 46, delete "$PI_{LSP} > PI_{MIN}$)" and insert -- $PI_{LSP} \geq PI_{MIN}$) --, therefor.

In column 19, line 9, in Claim 34, delete "predetemined" and insert -- predetermined --, therefor.

In column 19, line 14, in Claim 34, delete "farther" and insert -- further --, therefor.

Signed and Sealed this

Fourteenth Day of April, 2009

JOHN DOLL
*Acting Director of the United States Patent and Trademark Office*